United States Patent [19]

DeBenedictis et al.

[11] 4,170,028
[45] Oct. 2, 1979

[54] FACET TRACKING IN LASER SCANNING

[75] Inventors: Leonard C. DeBenedictis, Los Angeles; Richard V. Johnson, Pasadena, both of Calif.

[73] Assignee: Xerox Corporation, Stamford, Conn.

[21] Appl. No.: 785,258

[22] Filed: Apr. 6, 1977

[51] Int. Cl.$^2$ .................... H04N 3/08; H04N 3/10
[52] U.S. Cl. ............................ 358/285; 250/236; 350/6.7; 358/293
[58] Field of Search .............. 358/285, 293, 201, 206; 350/160 P, 160 W, 7, 285, 6.7, 359; 250/236

[56] References Cited

U.S. PATENT DOCUMENTS

| | | | |
|---|---|---|---|
| 3,055,258 | 9/1962 | Hurvitz | 350/161 W |
| 3,597,536 | 8/1971 | Fowler | 350/7 |
| 3,646,568 | 2/1972 | Woywood | 358/206 |
| 3,751,587 | 8/1973 | Insler | 358/293 |
| 3,910,675 | 10/1975 | MacGovern | 350/7 |
| 3,997,722 | 12/1976 | Bardos | 358/285 |
| 4,002,830 | 1/1977 | Brown et al. | 348/293 |
| 4,037,231 | 7/1977 | Broyles et al. | 358/293 |
| 4,103,156 | 7/1978 | Masaki et al. | 250/236 |

*Primary Examiner*—Robert L. Griffin
*Assistant Examiner*—Joseph A. Orsino, Jr.
*Attorney, Agent, or Firm*—Irving Keschner; Franklyn C. Weiss

[57] ABSTRACT

Method and apparatus for improving the efficiency of laser scanning systems using a multi-faceted rotating polygon as the scanner device. In particular, an acousto-optic Bragg cell is utilized as an active optical element to both modulate and deflect an incident laser beam so that the modulated beam is caused to follow one facet of the scanner during a complete scan and to shift to the adjacent facet for the following scan.

10 Claims, 8 Drawing Figures

START OF SCAN

MIDDLE OF SCAN

END OF SCAN

FACET TRACKING IN LASER SCANNING

BACKGROUND OF THE INVENTION

The use of laser scanning techniques for printing information on laser sensitive mediums have been disclosed in the prior art. For example, U.S. Pat. No. 3,922,485 discloses a multifaceted polygon optical scanner which scans a modulated laser beam across a xerographic medium. In order to print on the laser sensitive medium (i.e. the xerographic drum shown in the aforementioned patent), a laser of a particular output power is required. For example, the photoreceptor which comprises the xerographic medium disclosed in the aforementioned patent requires a laser flux of one milliwatt incident thereon to discharge predetermined charged areas of the photoreceptor to accomplish printing. In order to reduce the power requirements on the input laser which in turn, would reduce its cost and size, the prior art has sought to optimize laser efficiency or in other words, the efficiency of the optical system such that maximum laser beam power is provided on the photoreceptor for a given input laser rated at a certain output power. One approach has been the optimization of the key components which comprise the optical system such as the modulator, polygon scanner and other major optical elements. However, the optical system reaches a certain point where efficiency does not increase. It has been found that typically optical scanning system efficiencies are on the order of ten percent so that a ten milliwatt laser is required to apply one milliwatt of power on the photoreceptor. The impact of this performance is to require system designers to stress the laser power capability which in turn can effect the projected reliability, life, manufacturing cost, development cost, and field operational costs. The end result of this projection may be to lessen the competitiveness of laser scanning systems of the type described in the aforementioned patent for printing applications.

It should be noted that the inefficiency of some of the components in the system is due to the contamination of various optical surfaces as well as glass-air interface light power losses. The surface losses of each optical element in the system effects the transmission of each element and cumulatively effects the efficiency of the overall scanning system. Further, in scanning systems which require more than one facet to be illuminated in order to reduce retrace times, such as that disclosed in the aforementioned patent, reduced system efficiencies are the result since only one beam from one facet can be utilized at a time. Generally, in order to provide a relatively uniform amount of light across the scan line, the beam illuminating the scanner facets is expanded to fully illuminate the facets. The end result of the beam expansion is that the percentage of light which can get through the scanner, even if the surfaces thereof were perfect reflectors, is severely reduced. The problem inherent in illuminating two facets could be minimized by using a scanner facet dimension large compared to the optical beam at the polygon in the scan direction. Although this may be viable in a low resolution system or for a low speed scanner which can tolerate a large polygon dimension, this approach cannot be tolerated for high resolution systems or for high speed scanners.

SUMMARY OF THE INVENTION

The present invention provides method and apparatus for increasing the efficiency of laser scanning systems which utilize multifaceted polygons as the scanner and thus provide an improved scanner. In particular, an active optical element is utilized to deflect the incident laser beam so as to follow one facet during a complete scan and shift to the next facet for the following scan. The active optical element in low and high bandwidth systems preferably is an acousto-optic Bragg cell used to both modulate and deflect an incident laser beam.

The potential efficiency of the polygon-acousto-optic Bragg cell combination could exceed 90% and thereby increase the overall system transmission to a significant degree. For example, if only a 50% overall efficiency were obtained, the impact of a 2½ times reduction in input laser power requirements is dramatic. For example, systems which are 10% efficient and require 1 milliwatt of power at the laser sensitive medium require a 10 milliwatt input laser. By increasing system efficiency to 50%, a 2 milliwatt input laser can be utilized, thereby increasing laser life, decreasing laser purchase or manufacturing cost and increasing reliability performance which accompanies the use of lower powered lasers.

It is an object of the present invention to provide method and apparatus for increasing the efficiency of a laser scanning system.

It is a further object of the present invention to provide method and apparatus for increasing the efficiency of a laser scanning system whereby the printing power requirements on the input laser is substantially reduced.

It is still an object of the present invention to increase the laser light transmission efficiency of a laser scanning system which utilizes a rotating multifaceted polygon as the scanner.

It is yet another object of the present invention to provide method and apparatus for increasing the laser light transmission efficiency of a laser scanning system which utilizes a rotating multifaceted polygon as the scanner, an active optical element being utilized to deflect the laser beam so as to follow one facet during a complete scan and shifting the laser beam to the adjacent facet for the following scan.

It is a further object of the present invention to provide method and apparatus for increasing the laser light transmission efficiency of a laser scanning system which utilizes a rotating multifaceted polygon as the scanner, an acousto-optic modulator being utilized to deflect a modulated laser beam so as to follow one facet during a complete scan and shifting the laser beam to the adjacent facet for the following scan.

DESCRIPTION OF THE DRAWINGS

For a better understanding of the invention, as well as other objects and features thereof, reference is made to the following description which is to be read in conjunction with the accompanying drawings wherein.

DESCRIPTION OF THE PREFERRED EMBODIMENT

Figure 1:
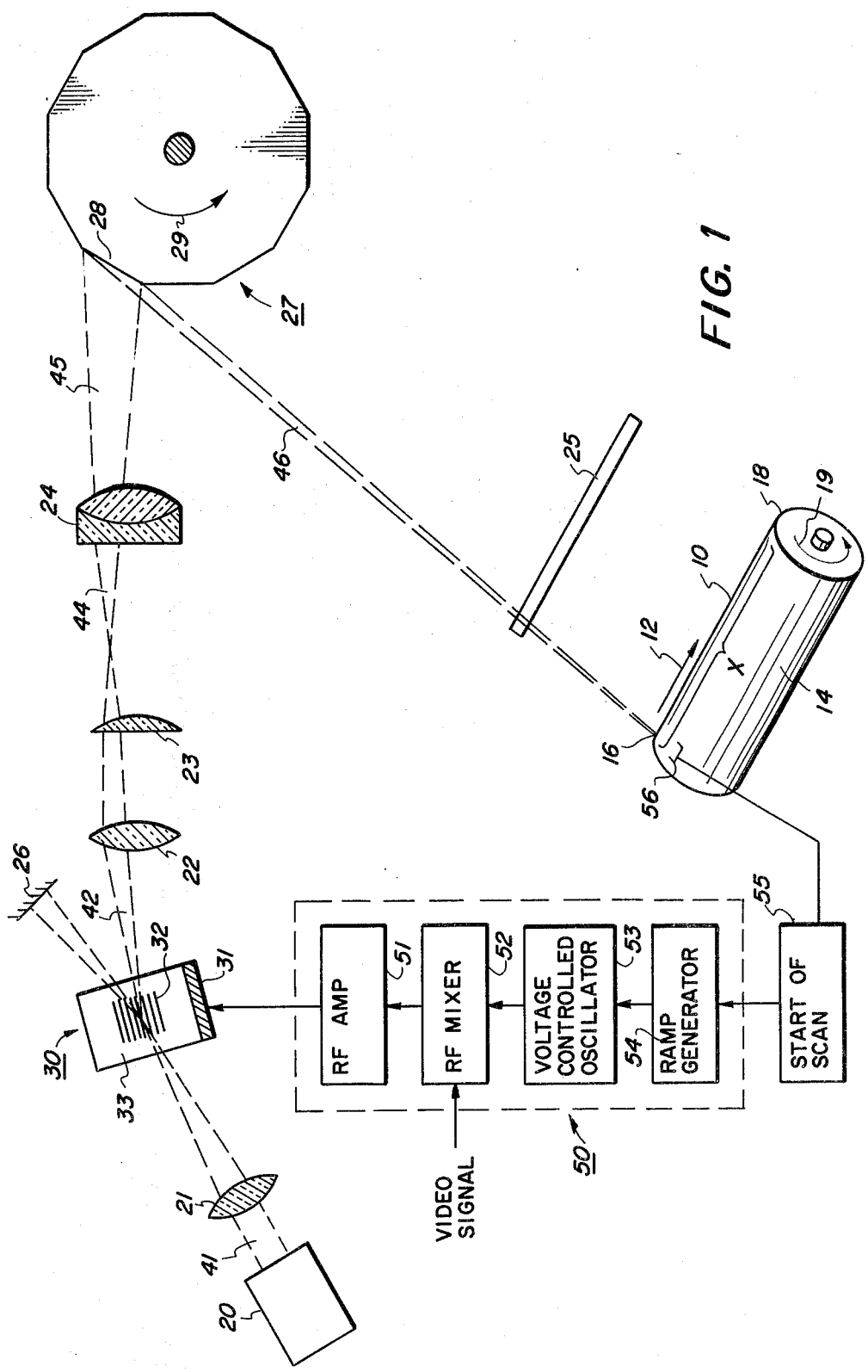
FIG. 1 is a partial schematic diagram of a preferred embodiment of the optical scanning system of the present invention at the start of scan position.

Referring now to FIG. 1, a partial schematic diagram of the improved optical scanning system of the present invention at the start of scan position is illustrated. The optical portion of the schematic shows the scanning system at the beginning of a scan line 10, the scan line 10 being in the direction of arrow 12 along the surface of a medium 14 which is sensitive to the laser flux utilized in the system. It is assumed that the scan line 10 starts at point 16 on the surface of medium 14, the scan line 10 being along a width x, i.e. from point 16 to point 18. As shown, medium 14 is preferably a xerographic drum which is rotated in the direction of arrow 19 to provide the Y direction of scan. A light source 20 provides the original light beam 41 for utilization by the scanning system. The light source 20 is preferably a helium-cadmium or helium-neon laser. It is to be understood that the aforementioned lasers are cited as examples and that any light source which generates a collimated beam of monochromatic light may be used. The laser which generates a collimated beam of monochromatic light may easily be modulated by an active optical element, acousto-optic modulator 30, in conformance with the information contained in video signal applied to the modulator controller as will be set forth hereinafter. A lens 21 is provided to focus the beam 41 onto the modulator 30.

Figure 3:
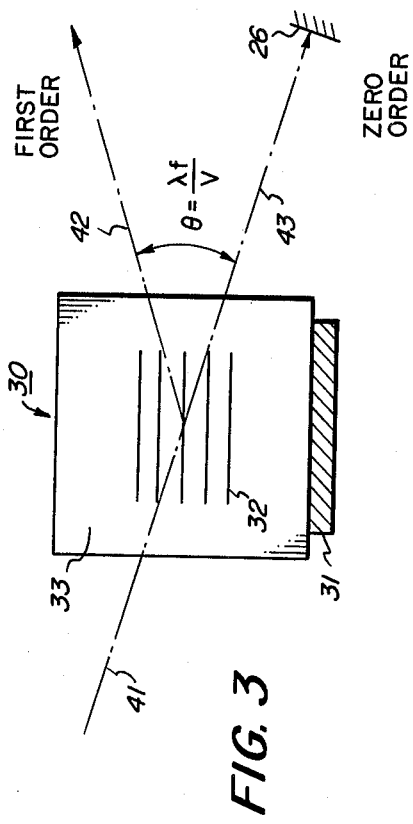
FIG. 3 is a schematic diagram of the active optical element used in the present invention.

FIG. 3 illustrates in schematic form the active optical element used in the present invention. The element 30 is an acousto-optic Bragg cell or, as it is more commonly called, an acoustic-optic modulator (hereinafter referred to as modulator). The modulator 30 comprises an electrically driven piezoelectric transducer 31 bonded to an acousto-optic material 33 which may be glass, plastic, or crystal. The transducer 31 in reponse to an electrical drive signal generates an acoustic-wave which travels through the material, perturbing the index of refraction and acting as a phase grating 32. Grating spacing is proportional to the drive or acoustic frequency. Grating density is proportional to the amplitude of the drive signal applied to the transducer 31.

A beam of light 41 is applied to the modulator. Without a signal applied to the transducer 31, only a non-diffracted output beam 43 exists. Application of a signal to the transducer produces two significant output beams, a first-order diffracted beam 42 and a zero-order non-diffracted beam 43. In the present invention, the first-order beam is the output, while the zero-order beam is absorbed by a beam stop 26. The intensity of the output beams is a function of the amplitude of the drive signal applied to the transducer.

An angle $\theta$ which represents the angle of diffraction exists between the first-order and zero-order beams. The angle $\theta$ is directly proportional to the acoustic frequency. Therefore this angle can be changed by varying the frequency of the drive signal applied to the transducer 31. An example of a modulator which may be used in the present invention is disclosed in U.S. Pat. No. 3,938,881.

With reference again to FIG. 1, the first-order beam 42 is positioned at the output of modulator 30 as shown, passes through a recollimating lens 22, and is then incident on cylindrical lens 23 having power in the tangential (direction of scan) direction. Cylindrical lens 23 expands beam 42 into a beam 44 which is incident on objective focusing lens 24. The lens elements 23 and 24 and the distance therebetween are selected such that the beam portion 45 at the output of lens 24 is directly incident onto a facet 28 of rotating multifaceted polygon 27 and thereafter focused as scan line 10 proximate the surface of recording medium 14. Preferably facet 28 is fully illuminated by the beam 45.

The rotational axis of polygon 27 is orthogonal or nearly orthogonal to the plane in which light beams 42 travels. The facets of the polygon 27 are mirrored surfaces for the reflection of any illuminating light impinging upon them. With the rotation of the polygon 27 in the direction shown by arrow 29, light beam 45 is reflected from illuminated facet 28 and translated through a scan angle for flying spot scanning. As will be set forth hereinafter in more detail, facet 28 (and each facet thereafter) is completely tracked during the scan of each scan line 10.

The beam portion 46 reflected from facet 28 passes through a cylindrical lens 25 which has power only in the sagittal direction (orthogonal to the direction of scan) beam portion 46 being focused at point 16 on surface of medium 14 as shown.

A control circuit 50 provides the drive signal to the modulator 30. The control circuit comprises a linear ramp generator 54 which provides a signal to a voltage controlled oscillator 53. The output of the oscillator is constant in amplitude with frequency dependent upon the voltage level applied by the ramp generator 54. The output of the oscillator is applied to one input of mixer 52. The electrical video signal which may contain information either by means of binary pulse code modulation or wide-band amplitude modulation is applied to the other input of mixer 52. The output of the mixer is amplified by amplifier 51 and then applied as a drive signal to transducer 31.

Figure 4:
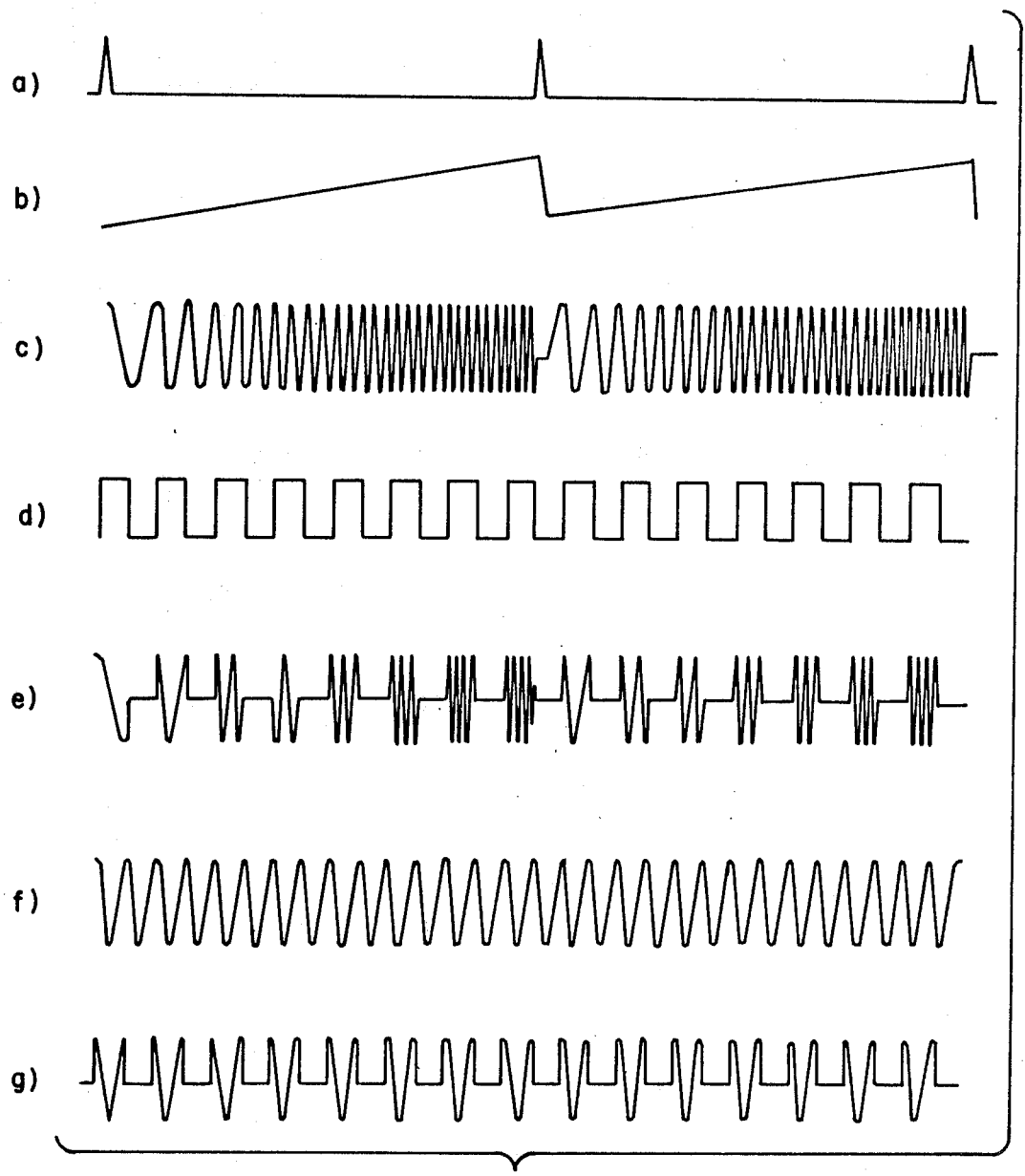
FIG. 4 is a wave form diagram for use in explaining the operation of the present invention.

The operation of the present invention will be described with reference to FIGS. 1 and 4. A start of scan detector 56 which may be any type of photodetector produces an output pulse (FIG. 4a) when light beam 46 is at point 16, the start of scan. The output pulse is sensed by a start of scan device 55, which may be any conventional switching device, to turn on the ramp generator 54. When the ramp generator is turned on, it generates a linear ramp of increasing voltage until the next start of scan is detected. At this point the output from the generator drops to zero and a new linear ramp is generated. The duration of the linear ramp depends on the time it takes for one scan. The waveform produced by the ramp generator 54 for two scans is shown in FIG. 4b.

The output of the ramp generator is applied to a voltage controlled oscillator 53. The oscillator generates the signal of constant amplitude with frequency dependent upon the voltage level applied from the ramp generator. The output of the voltage controlled oscillator is illustrated by the waveform in FIG. 4c. A waveform illustrating the electrical video signal applied to the control circuit 50 is illustrated in FIG. 4d. This signal as well as the output of the voltage controlled oscillator are applied to inputs of mixer 52. The output of mixer 52 is shown in FIG. 4e. This signal is amplified by amplifier 51 and then applied as a drive signal to the modulator transducer 31.

The drive signal (FIG. 4e) contains an amplitude component which varies the intensity of the first-order beam in accordance with the information contained in the electrical video signal. In addition, the variable frequency information contained in the drive signal causes the angle of diffraction to change in proportion to the frequency.

Figure 5A:
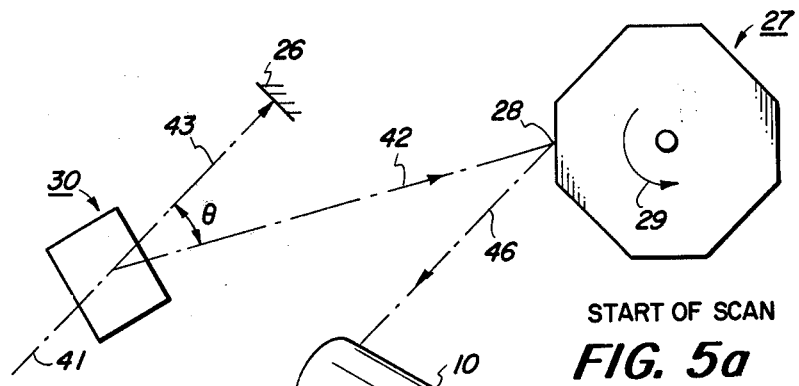
FIGS. 5a, 5b and 5c are a partial schematic diagram for use in explaining the facet tracking of the present invention.
Figure 5B:
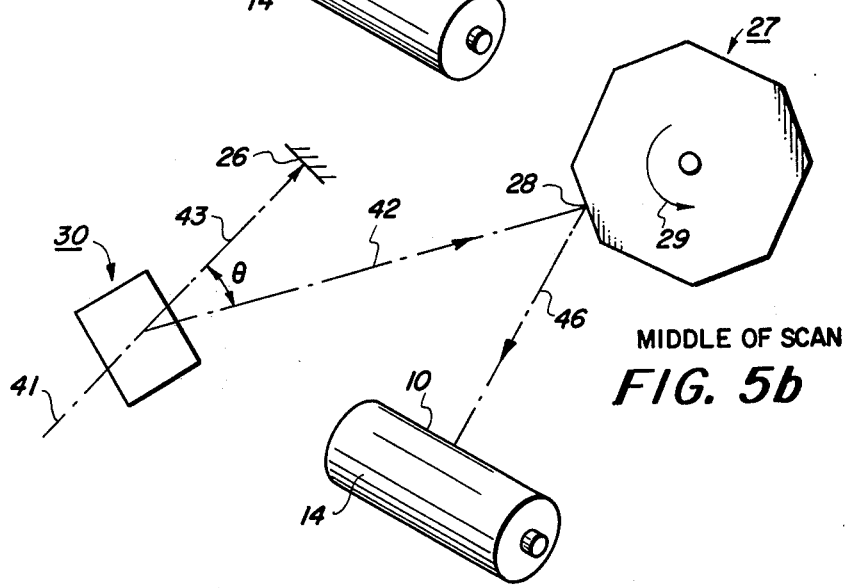
Figure 5C:
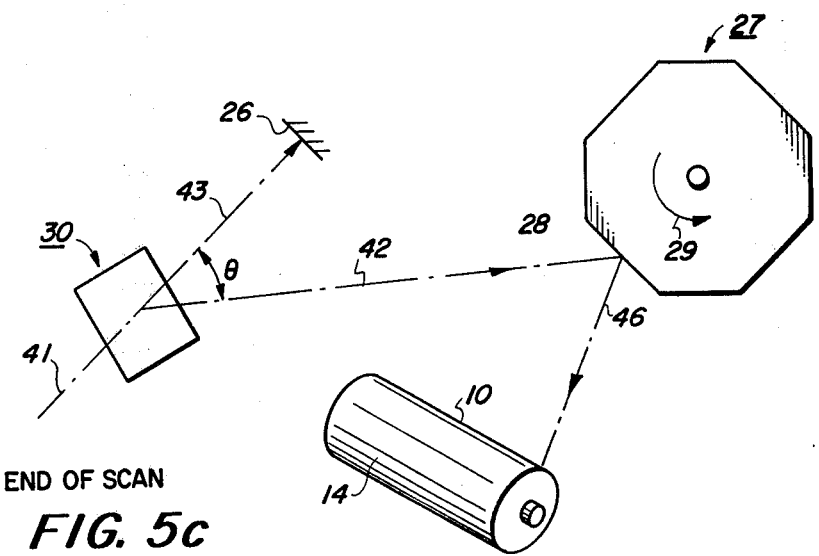

The change in the angle of diffraction at varying points along scan line 10 is illustrated in FIG. 5. FIG. 5a shows the start of the scan. FIG. 5b shows the middle of the scan. FIG. 5c shows the end of the scan. As can be seen, the angle of diffraction increase from the start to the end of the scan. This is as expected since, as stated before, the angle of diffraction is proportional to the frequency of the drive signal applied to the transducer.

As can be seen, the output drive signal combines frequency modulation for deflection of the first-order beam with amplitude modulation for modulation of the first-order beam. The output of the ramp generator 54 is chosen such that the frequency output of the voltage controlled oscillator 53 when mixed with the electrical video signal provides a drive signal which causes the first-order beam to track the mirrored facet 28 during the translation of the facet during the scan.

Figure 2:
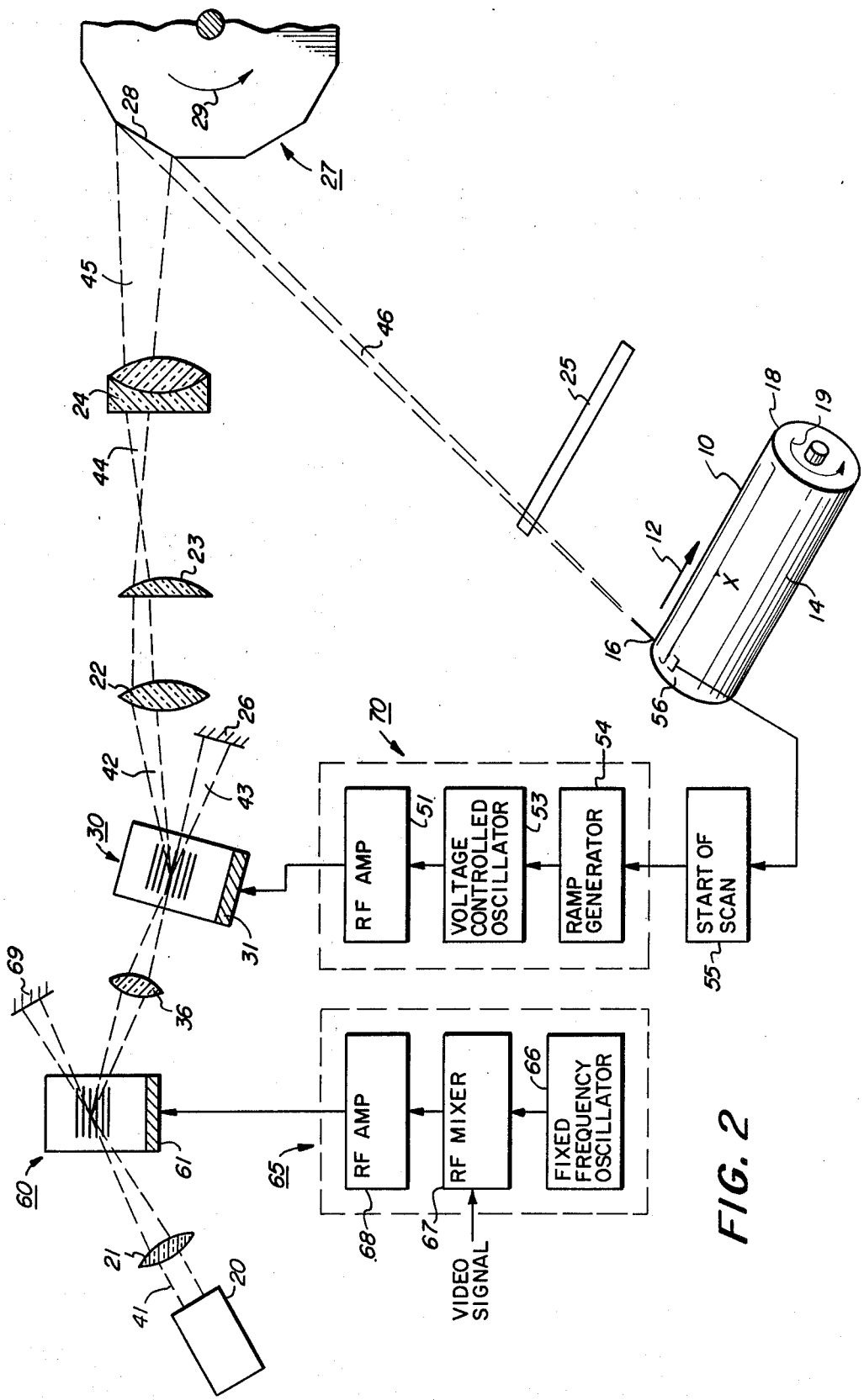
FIG. 2 is a partial schematic diagram of an additional embodiment of the optical scanning system of the present invention at the start of scan position.

An alternative embodiment for an improved laser scanner employing the present invention is shown in FIG. 2. An acousto-optic modulator 60 is used to modulate the light beam 41 in accordance with the information contained in the electrical video signal supplied to the control circuit 65. In the control circuit a fixed frequency oscillator 66 provides an output of constant amplitude and constant frequency (FIG. 4f) which is mixed with the electrical video signal (FIG. 4d) in mixer 67. The output of the mixer is amplified by amplifier 68 and then used as the drive signal (FIG. 4g) to the transducer 61. The output beam of the modulator 60 may be either the zero-order beam or the first-order beam, since the intensity of either beam is a function of the amplitude of the drive signal applied to the transducers 61.

The output beam of modulator 60 is applied to Bragg cell 30 via focusing lens 36. The operation of control circuit 70 is similar to that of control circuit 50 with the exception that the output of the voltage controlled oscillator 53 is not mixed with an electrical video signal but is directly applied via amplifier 51 as a drive signal to the transducer 31. The output of the voltage controlled oscillator (FIG. 4c) is a signal of constant amplitude with frequency dependent upon the voltage level applied by the ramp generator 54 as previously described. The intensity of the first order output beam is constant because the amplitude of the drive signal is constant. The angle of diffraction behaves in the same manner as previously described with respect to FIG. 1. The output of the ramp generator is chosen such that the frequency output of the voltage controlled oscillator causes the first order beam to track the facet 28 as the facet is translated during the scan.

Figure 6:
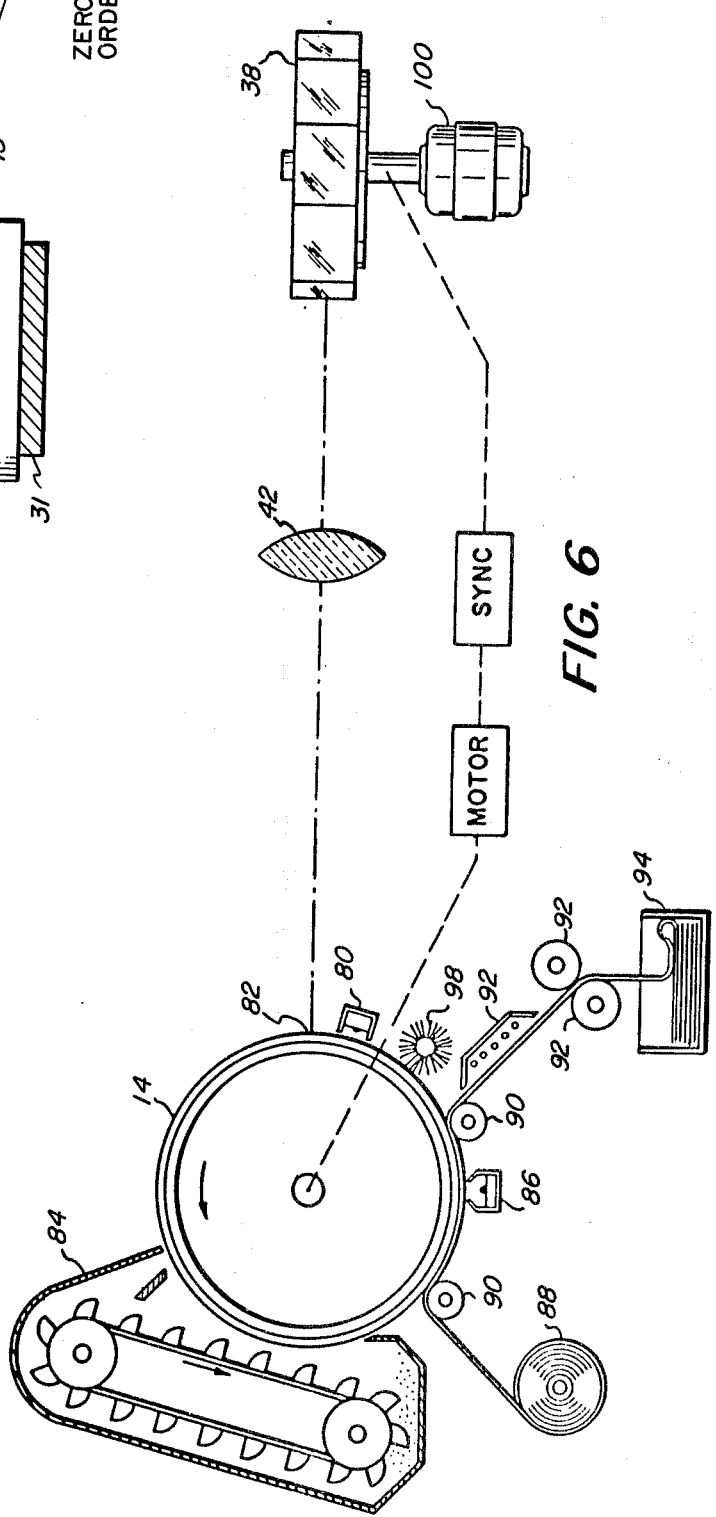
FIG. 6 shows a portion of the scanning system of the present invention being utilized to print information on a laser sensitive medium.

As set forth hereinabove and shown in FIG. 6, medium 14 may be a xerographic drum which rotates consecutively through a charging station depicted by corona discharge device 80, exposure surface 82 where the beam from the rotating polygon 38 traverses the scan width x on the drum 14, through developing station 84 depicted by a cascade development enclosure, transfer station 86 where a web of copy paper is passed in contact with the drum 14 and receives an electrostatic discharge to induce a transfer of the developed image from the drum 14 to the copy paper. The copy paper is supplied from the supply reel 88, passes around guide rollers 90 and through drive rollers 92 into receiving bin 94. A fusing device 96 fixes the images to the copy paper as it passes to bin 94.

Usable images are provided in that the information content of the scanning spot is represented by the modulated or variant intensity of light respective to its position within the scan width x. As the spot traverses the charged surface 82 through a given scan angle, the spot dissipates the electrostatic charge in accordance with its light intensity. The electrostatic charge pattern thus produced is developed in the developing station 84 and then transferred to the final copy paper. The xerographic drum 14 is cleaned by some cleaning device such as a rotating brush 98 before being recharged by charging device 80. In this manner, the information content of the scanned spot is recorded on a more permanent and useful medium. Of course, alternative prior art techniques may be employed to cooperate with a scanned spot in order to utilize the information contained therein.

The polygon 38 is continuously driven by a motor 100 and synchronized in rotation to a synchronization signal representative of the scan rate used to obtain the original video signal. The rotation rate of the xerographic drum 14 determines the spacing of the scan lines. It also may be preferable to synchronize the drum 14 in some manner to the signal source to maintain image linearity.

While the invention has been described with reference to its preferred embodiment, it will be understood by those skilled in the art that various changes may be made and equivalents may be substituted for elements thereof without departing from the true spirit and scope of the invention. Those skilled in the art will appreciate the fact that use may be made of either the + first order beam or the − first order beam of the acousto-optic modulator to carry out the tracking of the subject invention. In addition, either a "low to high" or a "high to low" frequency drive signal may be employed depending on which order beam is chosen as well as the direction of rotation of both the multi-faceted polygon 27 and the medium 14. Further, many modifications may be made to adapt to particular situations or material to the teaching of the invention without departing from its essential teachings.

What is claimed is:

1. An improved flying spot scanning system for recording information from an electrical signal onto a scanned medium comprising:
   means for both providing a beam of radiant energy;
   means for modulating said beam in accordance with the information content of said electrical signal and deflecting said modulated beam in response to a drive signal;
   means for focusing said modulated beam to a spot upon the surface of a light sensitive medium;
   scanning means having at least one reflective surface positioned in the optical path of said modulated beam for rotating said reflective surface a desired angle in order to scan said spot across said medium to impart the information content of said spot to said medium;
   means for generating a signal representing the start of said scan; and drive signal means responsive to said start of scan signal and operatively connected to said modulating means for producing a drive signal, said drive signal causing said modulated beam to track a discrete area of said reflective surface during the rotation and translation of said reflective surface during said scan.

2. The system of claim 1 wherein the scanning means includes a multifaceted polygon having reflective facets for reflecting the radiant energy incident to it onto said medium and means for rotating said polygon such that the reflected light is scanned in successive traces across said medium.

3. The system of claim 2 wherein said radiant energy means is a laser which emits a beam of collimated light.

4. The system of claim 2 wherein said drive signal means includes:
means for producing an output signal of constant amplitude and a frequency dependent upon a voltage applied to its input;
means responsive to the start of a scan signal for generating said input voltage, said input voltage being related to the distance travelled by said reflective surface during the scan; and
means for processing said electrical signal and said output signal to provide said drive signal.

5. The system of claim 2 wherein said modulating and deflecting means is an acousto-optic Bragg cell.

6. An improved flying spot scanning system for recording information from an electrical signal onto a scanned medium comprising:
means for providing a beam of radiant energy;
means for generating a signal representing the start of a scan;
an active optical element for both modulating and deflecting said beam in accordance with the information content of a drive signal applied thereto;
means for focusing said modulated and deflected beam to a spot upon the surface of a medium sensitive to said radiant energy;
scanning means having at least one reflective surface positioned in the optical path of said modulated and deflected beam for scanning said spot across said medium by rotating said reflective surface a desired angle to impart the information content of said spot to said medium; and
means responsive to the start of a scan signal and said electrical signal for providing said drive signal causing said beam to track said reflective surface during the rotation and translation of said reflective surface during said scan; said drive signal means including first means for providing an output signal of constant amplitude and a frequency dependent upon a voltage applied at its input, means responsive to the start of a scan signal for generating said input voltage, said input voltage being related to the distance travelled by said reflective surface during a scan, and means for processing said electrical signal and said output signal to provide said drive signal.

7. The system of claim 6 wherein said voltage input comprises a linear ramp whose duration corresponds to the time required to scan one trace.

8. An improved flying spot scanning system for recording information from an electrical signal onto a scanned medium comprising:
means for providing a beam of radiant energy;
means for generating a signal representing the start of a scan;
an active optical element for both modulating and deflecting said beam in accordance with the information content of a drive signal applied thereto;
means for focusing said modulated and deflected beam to a spot upon the surface of a medium sensitive to said radiant energy;
scanning means having at least one reflective surface positioned in the optical path of said modulated and deflected beam for scanning said spot across said medium by rotating said reflective surface a desired angle to impart the information content of said spot to said medium, and
means responsive to the start of a scan signal and said electrical signal for providing said drive signal, said drive signal causing said beam to track said reflective surface during the rotation and translation of said reflective surface during said scan, said beam tracking a discrete area of said reflective surface.

9. An improved flying spot scanning system for recording information from an electrical signal onto a scanned medium comprising:
means for providing a beam of radiant energy;
means for generating a start of a scan signal;
a first active optical element for modulating said beam in accordance with the information content of said electrical signal coupled thereto;
a second active optical element for deflecting said modulated beam in accordance with the information content of a drive signal applied thereto;
means for focusing said modulated and deflected beam to a spot upon the surface of a medium sensitive to said radiant energy;
scanning means having at least one reflective surface positioned in the optical path of said modulated and deflected beam for scanning said spot across said medium by rotating said reflective surface a desired angle to impart the information content of said spot to said medium; and
means responsive to the start of a scan signal for providing said drive signal, said drive signal causing said beam to track said reflective surface during the rotation and translation of said reflective surface during said scan, said beam tracking a discrete area of said reflective surface.

10. An improved flying spot scanning system for recording information from an electrical signal onto a scanned medium comprising:
means for providing a beam of radiant energy;
means for generating a start of scan signal;
a first active optical element for modulating said beam in accordance with the information content of said electrical signal coupled thereto;
a second active optical element for deflecting said modulated beam in accordance with the information content of a drive signal applied thereto,
means for focusing said modulated and deflected beam to a spot upon the surface of a medium sensitive to said radiant energy;
scanning means having at least one reflective surface positioned in the optical path of said modulated and deflected beam for scanning said spot across said medium by rotating said reflective surface a desired angle to impart the information content of said spot to said medium; and
means responsive to the start of a scan signal for providing said drive signal, said drive signal causing said beam to track a discrete area of said reflective surface during the rotation and translation of said reflective surface during said scan, said drive signal means including first means for providing an output signal of constant amplitude and a frequency dependent upon a voltage applied its input, means responsive to the start of a scan signal for generating said input voltage, said input voltage being related to the distance travelled by said reflective surface during a scan, and means for processing said electrical signal and said output signal to provide said drive signal.

* * * * *